April 29, 1930.  W. H. COLES ET AL  1,756,729
SPRINKLER
Filed March 12, 1928  2 Sheets-Sheet 1
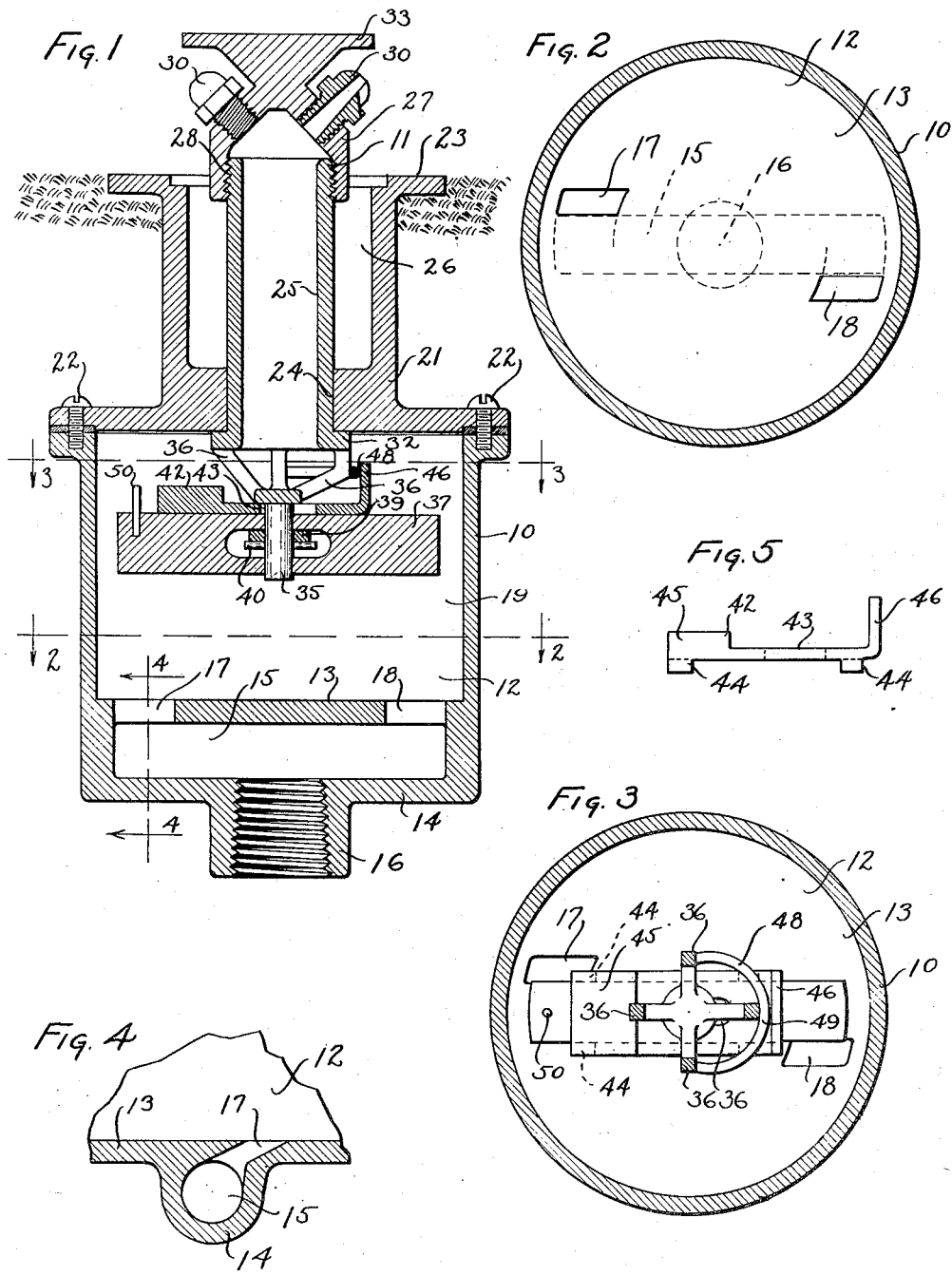
INVENTOR
Walter H. Coles
Bert J. Nelson
BY Maréchal and Noe
ATTORNEY April 29, 1930. W. H. COLES ET AL 1,756,729
SPRINKLER
Filed March 12, 1928 2 Sheets-Sheet 2
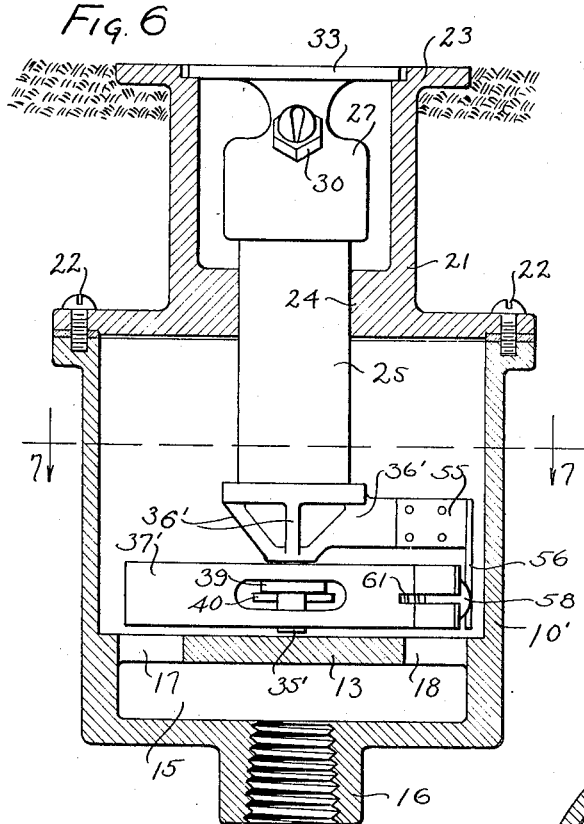
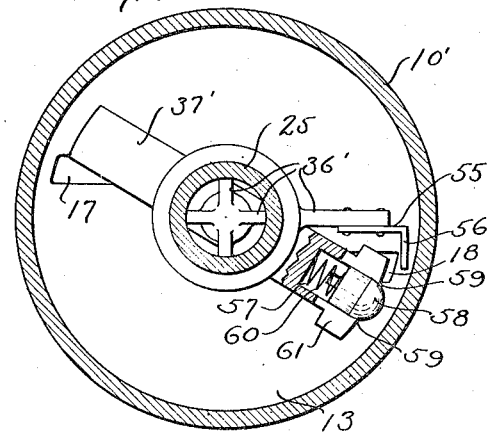
INVENTOR
Walter H. Coles
Bert J. Nelson
BY Maréchal and Noe
ATTORNEY Patented Apr. 29, 1930

1,756,729

UNITED STATES PATENT OFFICE

WALTER H. COLES AND BERT J. NELSON, OF TROY, OHIO, ASSIGNORS TO THE SKINNER IRRIGATION COMPANY, OF TROY, OHIO, A CORPORATION OF OHIO

SPRINKLER

Application filed March 12, 1928. Serial No. 260,985.

This invention relates to sprinkling or irrigating apparatus, and particularly to sprinklers having a sprinkling member adapted to be slowly rotated while in operation.

One object of the invention is the provision of a sprinkler of this character having a water-operated impact member adapted to effect comparatively slow rotation of the sprinkling member.

Another object of the invention is to provide a sprinkler having a rotatable sprinkling member with means for imparting successive rotative impulses thereto to effect rotary actuation of the sprinkling member.

Another object of the invention is the provision in such apparatus of a sprinkling member adapted to be rotated due to step-by-step impulses imparted thereto by a member operated by the passage of water through the sprinkler, the sprinkling member being raised to an operative extended position by the pressure of the water supplied to the sprinkler.

A further object of the invention is the provision of a sprinkler of the character mentioned which is of simple and compact construction, with few moving parts.

Other objects and advantages of the invention will be apparent from the following description and from the accompanying drawing in which—

Fig. 1 is a vertical central section through a sprinkler embodying the present invention;

Fig. 2 is a horizontal section on the line 2—2 of Fig. 1;

Fig. 3 is a horizontal section on the line 3—3 of Fig. 1 showing the impact member.

Fig. 4 is a section on the line 4—4 of Fig. 1, through the lower part of the supporting housing;

Fig. 5 is a detail, in side elevation, of the impact member;

Fig. 6 is a central vertical section through a somewhat modified form of sprinkler apparatus; and Fig. 7 is a section on the line 7—7 of Fig. 6.

In the carrying out of this invention a sprinkling member is provided which is desired to be slowly rotated, and there is associated with this member a driving member which is rotated at a comparatively rapid rate under the reactive influence of the water passing to the sprinkling member, there being provisions whereby successive power impulses are imparted to the sprinkling member as the driving member rotates. In the drawings a preferred embodiment of the invention is illustrated, and also a somewhat modified form of mechanism which will function equally as well. Referring first to the form of construction shown in Figs. 1 to 5 inclusive, the mechanism is shown as comprising a supporting housing 10 in which is rotatably mounted the rotatable sprinkling member 11. The supporting housing comprises a lower section 12, having a bottom 13 to which is cast an enlargement 14 having a transverse water passage 15 therein. This enlargement is preferably provided with a centrally arranged internally-threaded boss 16 adapted to be connected to a suitable water supply pipe. Opening from the passage 15, through the lower wall 13, are openings 17 and 18 through which the water supplied to passage 15 passes to the main chamber 19 of the housing.

To the top of lower section 12 is attached the top section 21 by means of suitable screws 22, and the top face 23 of this section is adapted to be positioned substantially flush with the upper surface of the ground as shown in Fig. 1 the supporting housing being buried below the ground level. The cylindrical inner surface of the top section as indicated at 24 provides a bearing for the cylindrical pipe 25 of the sprinkling member. A recess or pocket 26 is provided in the top section 22 of the supporting housing, which is adapted to receive the sprinkling head 27 of the sprinkling member, when in retracted or inoperative position, this sprinkling head being detachably fixed to the top of the pipe 25 as by means of suitable screw-threads 28 provided on these parts. The lower end of the pipe 25 is in free communication at all times with the main chamber 19 of the supporting housing so that water may be supplied through the pipe and through the distributing nozzles 30 on the sprinkling head. When water is supplied under pressure to the supporting housing, the sprinkling member is raised to the position shown in Fig. 1 by the pressure of the water, the flange 32 on the bottom of the pipe 25 defining the limit of upward movement of the sprinkling member, this flange being adapted to abut against the lower surface of the top section 22 of the supporting housing when in the raised position to present a sufficiently tight joint to prevent water from flowing along the outside of the pipe 25. In this position the sprinkling head will be above the level of the top of the supporting housing and the nozzles will be above the level of the ground around the sprinkler so that the water may be distributed from the nozzles 30 when the sprinkler is in operation. However when the supply of water to the sprinkler is cut off the sprinkling head wall fall of its own weight, and the top 33 of the sprinkling head will then be positioned flush with the top of the supporting housing section 22, and flush with the level of the ground, in which position the entire sprinkler is out of the way. In the inoperative position of the sprinkling head mowing of the grass is permitted and the sprinkler is inconspicuous and does not interfere with the smooth ground contour.

The nozzles 30 are positioned on the sprinkling head so as to discharge water in a radial direction and at an angle to the horizontal so as to obtain a maximum range or throw of water. By reason of this arrangement of the nozzles, with the water discharging in a radial direction and at the proper angle to the horizontal, water may be supplied a maximum distance away from the sprinkler. To distribute the water in all directions from the sprinkler the sprinkling head is adapted to be slowly rotated about its vertical axis, in the following manner.

The lower end of the pipe 25 of the sprinkling member supports a short downwardly extending shaft 35 by means of the spaced arms 36 rigid with both the shaft 35 and the pipe 25, the spaces between the arms providing free communication between the interior of the chamber 19 and the hollow pipe 25. On this shaft 35 is rotatably mounted an actuating device or driving member 37 which is shown as in the form of a bar having a vertical cylindrical passage by means of which it is rotatably mounted on the shaft. The bar is preferably horizontally slotted as indicated at 38 so that a washer 39 and a retaining pin 40, passing through the shaft 35, serve to hold the bar against movement along the shaft while permitting its free rotation thereon. Mounted on the bar 37 is a movable impact member. This member in this embodiment of the invention is a centrifugally actuated slide 42 having a slotted opening 43 of a width sufficient to receive the shaft 35, and the slide 42 is thus adapted to be moved along the bar 37 in the direction of its length without restraint from any springs or other attachments. The slide 42 is preferably guided along the top of the bar 37 by means of depending ears 44 on the slide. One end of the slide is heavier than the other, being weighted as indicated at 45. On the opposite end of the slide is provided with an upwardly extending impact arm 46 which is so positioned as to strike a cam ring 48 which is brazed or otherwise provided on the arms 36 of the sprinkling member. The cam ring 48 is so shaped as to extend a considerable distance from the central vertical axis of the sprinkling member at the point 49, this portion of the cam ring being in the path of movement of the impact arm 46 of the slide when the slide is held outwardly against the stop pin 50 on the bar 37 by the action of centrifugal force resulting from rotation of the bar at substantial speed. As shown the water inlet openings 17 and 18 in the bottom of the housing are shaped, as shown in Fig. 4, so that the water is directed in a tangential direction into the main chamber 19, and as a result a swirling or rotary action is imparted to the water within the main chamber 19, this swirling action being in a clockwise direction as viewed from above in the embodiment of the invention shown in the drawing. The bar 37 is rotated by this swirling action of the water as it passes through the chamber 19 to the sprinkling member, and it will be apparent that the slide 42 will be moved under these conditions to the left as viewed in Fig. 1, so that the impact arm 46 will strike the cam ring on rotation to impart successive rotative impulses thereto to thus impart comparatively slow rotative movement to the sprinkling member. Each time the bar 37 is rotated once by the reactive action of the water supplied through the supporting housing, the cam ring will be struck, yet the slide is held in its outward position only by centrifugal force so that it may move to a more central position as indicated in Fig. 3 to permit the bar to continue its rapid rotation, and the sprinkling member is thus rotated by the successive rotative forces resulting from such impacts. This arrangement is particularly advantageous as it permits the initial rotation of the bar 37, when the water is first turned on, without any substantial interference with the free rotation of this bar, since at this time there will not be sufficient centrifugal force tending to hold the slide 42 in effective impacting position. However when a substantial speed of rotation has been imparted to the bar 37 by the rushing water in the housing, the impact arm 46 becomes effective, due to the action of centrifugal force, and strikes the cam ring each time it moves past it so as to effectively cause the rotational movements of the sprinkling member. If desired means may be provided to hold the slide so that it will not contact with the impact arm until the flow of water has imparted sufficient speed of rotation to the member 37 to make sure of the presence of sufficiently large relative impulses. For example, a cam, actuated by a vane which assumes a positioning dependent upon its rate of movement relative to the water may be used. Or if desired, a spring may be used urging the slide into impacting position so that the device is not dependent upon rotation of the bar 37 for its positioning.

A modified form of construction is shown in Figs. 6 and 7. In Fig. 6 the sprinkling member is shown in its housed or lowered ineffective position and the sprinkling member and the housing in which it is mounted are similar in construction to the form of the invention shown in Figs. 1 to 5 inclusive. The sprinkling member, in this form of the invention, is provided with an arm 55 extending outwardly from the supporting arms 36' which carry the shaft 35'. This arm 55 has a depending arm 56 positioned rather close to the cylindrical wall of the supporting housing 10'. The rotative member 37' is rotatably mounted upon the shaft 35' in the same manner as in the form of construction first described so it may be rotated by the swirling action of the water in the housing. This member 37 at one end is provided with a recess 57 within which is mounted a movable member 58, which is retained at least partially within the recess at all times by means of the peaned portions 59 at the end of the recess, a spring 60 within the recess serving to urge the member 58 outwardly. The recess 57 however is large enough to permit free outward movement of the member 58. The end of the member 37 is provided with cross slots 61 which vent the recess behind the slidable member 58 thus preventing accumulated water from interfering with movement thereof during operation and also serving to prevent the accumulation of dirt within the recess back of the slidable member 58. The bar 37' is rotated by the water in the supporting housing in the same manner as in the embodiment of the invention previously described, and the sprinkling head is adapted to be raised by the pressure of the water on the sprinkling head when the device is in operation, so that the sprinkling nozzles 30' will be raised to an effective or operative position above the ground level. The member 58 when held outwardly strikes against the downwardly extending arm 56 carried by the rotatable sprinkling member, and the sprinkling member is thus adapted to be moved rotationally by the successive impacts imparted thereto as the driving member rotates at a comparatively high speed when in operation. In both forms of apparatus the sprinkling member will ordinarily be given a rotation at the rate of one to two rotations per minute—while the bar rotates probably several hundred times as fast. But of course by properly proportioning the parts the rate of rotation of the sprinkler may be varied as desired. The member 58 need project only far enough to deliver a rotative impact, and as the arm 56 is struck the member 58 will move inwardly to permit the bar 37' to continue its rotational movements. The spring 60 need be of very light weight since the centrifugal force during rotation will supplement its action. In practice its tension will be such that at very low speeds, as when the device is first put into operation, the free rotational movement of the bar 37' will not be seriously interfered with or restricted, and the member 58 will not ordinarily be urged outwardly with considerable force until substantial speed of rotation develops substantial centrifugal force and at low speeds the member 58 may move freely toward inner position in the recess 57. It will thus be apparent that the slow rotational movement of the sprinkling head for the distribution of the water all about the sprinkler to a maximum radial distance is insured when the device is in operation. If desired the spring 60 may be entirely dispensed with, in which event the positioning of the movable member 58 will be dependent upon the effect of rotation.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A device of the class described comprising a support adapted to receive water under pressure, a sprinkling member rotatably mounted on said support and having a sprinkling nozzle, a device rotatably mounted adjacent said member and adapted to be revolved by the power of the water supplied to said support, and means carried by said device and adapted to be urged outwardly under the action of centrifugal force so as to strike said member and impart a rotative impulse to said sprinkling member for each revolution of said device.

2. A device of the class described comprising a support adapted to receive water under pressure, a sprinkling member rotatably mounted on said support and having a sprinkling nozzle, said sprinkling member being mounted for vertical movement on said support so as to be raised to an extended position by pressure of the water supplied to said support, a device rotatably mounted adjacent said member and adapted to be revolved by the power of the water supplied to said support, and means carried by said device and adapted to be urged outwardly under the action of centrifugal force so as to strike said member and impart a rotative impulse to said sprinkling member for each revolution of said device.

3. A device of the class described comprising a support adapted to receive water under pressure, a sprinkling member rotatably mounted on said support on a vertical axis and having a nozzle directed substantially radially and upwardly, a projection on said member, a device rotatably mounted on a vertical axis adjacent said member and adapted to be revolved by the power of the water supplied to the support, an impact member carried by said device and adapted to be urged outwardly on said device under the action of centrifugal force so as to strike said projection when the device is rotating at a substantial speed, and to impart successive rotative impulses to the sprinkling member to rotate said sprinkling member about its vertical axis.

4. A device of the class described comprising a supporting housing adapted to receive water under pressure, said housing having provision for creating a swirling rotation of the water, a sprinkling member rotatably mounted on a vertical axis on said support and having a nozzle directed substantially radially and upwardly, a projection on said member, a device mounted adjacent said member so as to rotate about said vertical axis and adapted to be revolved by the swirl of the water in the supporting housing, and means carried by said device and adapted to move outwardly under the action of centrifugal force to an effective position where it strikes said projection and imparts successive power impulses to the sprinkling member each said impulse being limited in duration to a fraction of each revolution of said device.

5. A sprinkler of the class described comprising a supporting housing adapted to receive water under pressure, said housing having provision for imparting a swirling movement to the water received, a sprinkling member rotatably mounted in said supporting housing, said sprinkling member having a plurality of equally-spaced nozzles directed radially and upwardly, a device rotatably mounted on said sprinkling member and adapted to be revolved by the swirling action of the water in the supporting housing, and means movably carried by said device and adapted to move outwardly under the action of centrifugal force and in its outer position being adapted to strike said member and impart step-by-step impulses each adapted to move said member through a small fraction of a revolution for each revolution of said device.

6. A sprinkler of the class described comprising a supporting housing adapted to receive water under pressure, said housing having provision for imparting a swirling movement to the water received, a sprinkling member rotatably mounted in said supporting housing, said sprinkling member having a plurality of equally-spaced nozzles directed radially and upwardly and being mounted for vertical movement on said supporting housing from an inoperative position flush with the top of the supporting housing to a raised position by the pressure of the water in the supporting housing, a device rotatably mounted on said sprinkling member and adapted to be revolved by the swirling action of the water in the supporting housing, and means movably carried by said device and adapted to move outwardly under the action of centrifugal force and in its outer position being adapted to strike said member and impart step-by-step impulses each adapted to move said member through a small fraction of a revolution for each revolution of said device.

7. In combination, in a device of the class described, a revoluble sprinking member, a housing therefor, means rotatably mounted on a vertical axis in said housing and adapted to be moved by the passage of water through said housing, and centrifugal means movably held on said first-named means, and means on said sprinkling member adapted to be struck by said centrifugal means when a substantial speed of rotation has been attained.

8. A sprinkler of the class described, comprising a supporting housing adapted to receive water under pressure, provision for causing a swirling motion of the water in the housing, a sprinking member rotatably mounted on said supporting housing and vertically movable by the pressure of the water in said housing, and an impact member rotatably mounted on a vertical axis adjacent said sprinkling member so as to be rotated by the swirling action of the water in the supporting housing, and movable outwardly under the action of centrifugal force to a position where it is adapted to strike said sprinkling member to impart successive rotative impulses thereto.

9. A sprinkler of the class described comprising a rotatable sprinkling member, a housing therefor, a sprinkling nozzle on said sprinkling member directed radially and upwardly and normally located within said housing, said sprinkling member being adapted to be moved upwardly to an extended position with the sprinkling nozzle above the top of said supporting housing by the pressure of the water in the housing, and centrifugal means actuated by the water in said housing adapted to impart a step-by-step rotational movement to said sprinkling member, said means being ineffective on said sprinkling member at very low speeds of rotation.

10. A device of the class described comprising a support adapted to receive water under pressure, a sprinkling member rotatably mounted on said support and having a sprinkling nozzle, a device mounted adjacent said member for relative rotation with respect to said member and adapted to be revolved when water is supplied to said support, and means movably carried by said device and adapted to be influenced by centrifugal force when said device is rapidly revolved to strike said sprinkling member and impart a rotative impulse to said member for each revolution of said device.

11. A sprinkler of the class described comprising a supporting housing having provision for imparting swirling movement to the water received, a sprinkling member rotatably mounted on said supporting housing and having a sprinkling nozzle, a device revolubly journaled within said supporting housing and adapted to be revolved by the swirling movement of the water in said housing, and means on said device adapted to strike said sprinkling member and impart step by step impulses each adapted to move said sprinkling member through a small fraction of a revolution for each revolution of said device.

12. A sprinkler of the class described comprising a supporting housing having provision for imparting swirling movement to the water received, a sprinkling member rotatably mounted on said supporting housing and having a sprinkling nozzle, a device revolubly mounted within said supporting housing and adapted to be revolved by the swirling movement of the water in said housing, and an impact member movably carried by said device and movable to an effective position where it strikes said sprinkling member and imparts step by step impulses each adapted to move said sprinkling member through a small fraction of a revolution for each revolution of said device, the impact member being movable on said device upon impact with the sprinkling member so the impact member may continue its rotational movements.

13. A sprinkler of the class described comprising a supporting housing having provision for imparting swirling movement to the water received, a sprinkling member rotatably mounted on said supporting housing and having a sprinkling nozzle, a device revolubly mounted on said sprinkling member within said supporting housing and adapted to be revolved by the swirling motion of the water in said housing, and an impact member movably carried by said device and movable to an effective position where it strikes said sprinkling member and imparts step by step impulses each adapted to move said sprinkling member through a small fraction of a revolution for each revolution of said device, said impact member comprising a centrifugally actuated slide movable radially on said device and having a striker engageable with a portion of said sprinkler member.

14. A sprinkler of the class described comprising a rotatable sprinkling member, a housing therefor, a sprinkling nozzle on said sprinkling member directed radially and upwardly and normally located within said housing, said sprinkling member being adapted to be moved upwardly to an extended position with the sprinkling nozzle above the top of said supporting housing by the pressure of the water in the housing, and means within said housing actuated by the movement of the water in said housing adapted to impart step by step rotational movements to said sprinkling member.

15. A sprinkler of the class described comprising a rotatable sprinkling member having a water passage therein, a sprinkling nozzle on said sprinkling member and connected to said water passage, a housing portion within which said sprinkling member is normally located in retracted position, said sprinkling member being adapted to be moved during sprinkling operation by the pressure of the water to an extended operating position with the sprinkling nozzle above the top of said housing portion, a water chamber to which the said water passage is connected, and means within said water chamber actuated by the movement of the water therein to impart controlled rotational movement to said sprinkling member.

16. A sprinkler of the class described comprising a rotatable sprinkling member having a water passage therein, a sprinkling nozzle on said sprinkling member and connected to said water passage, a housing portion within which said sprinkling member is normally located in retracted position, said sprinkling member being adapted to be moved during sprinkling operation by the pressure of the water to an extended operating position with the sprinkling nozzle above the top of said housing portion, a water chamber to which the said water passage is connected, and means within said water chamber actuated by the movement of the water therein to impart step by step rotational movement to said sprinkling member.

17. A sprinkler of the class described comprising a rotatable sprinkling member having a water passage therein, a sprinkling nozzle on said sprinkling member connected to said water passage and adapted for lateral sprinkling of the water, a housing portion within which said sprinkling member is normally located, said sprinkling member being adapted to be moved upwardly during operation by the pressure of the water to an extended position with the sprinkling nozzle above the top of said housing portion, a water chamber to which the said water passage is connected, and means associated with said sprinkling member and actuated by the movement of the water passing through said water chamber and adapted for rapid rotation to exert a driving force on the sprinkling member to effect slow rotation of said sprinkling member.

18. A sprinkler of the class described comprising a water chamber, a sprinkling member mounted on said water chamber and having a sprinkling nozzle, a device revolubly mounted within said water chamber and adapted to be revolved by the movement of the water in said water chamber, and means on said device adapted to strike said sprinkling member and impart step by step impulses thereto, each impulse adapted to move said sprinkling member through a small fraction of a revolution for each revolution of said device.

In testimony whereof we hereto affix our signatures.

WALTER H. COLES.
BERT J. NELSON.